June 16, 1942.  W. C. WEBER ET AL  2,286,323
APPARATUS AND METHOD FOR FEEDING AND FABRICATING GLASS
Filed Jan. 11, 1940  3 Sheets-Sheet 2
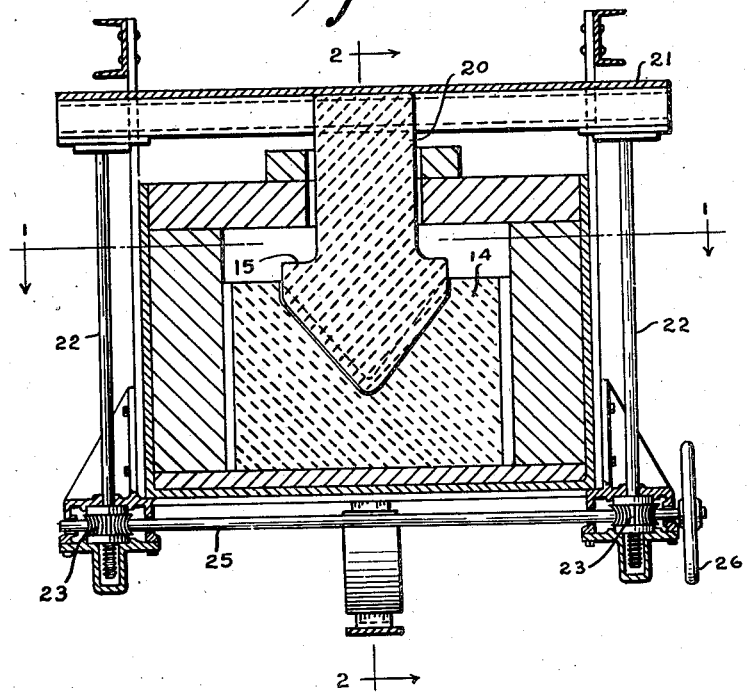
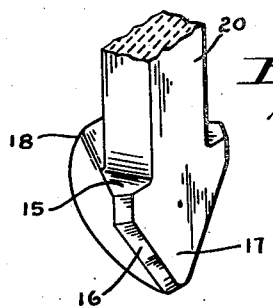
INVENTORS.
WALTER C. WEBER
AND EDMUND H. WELLECH
BY
ATTORNEY.

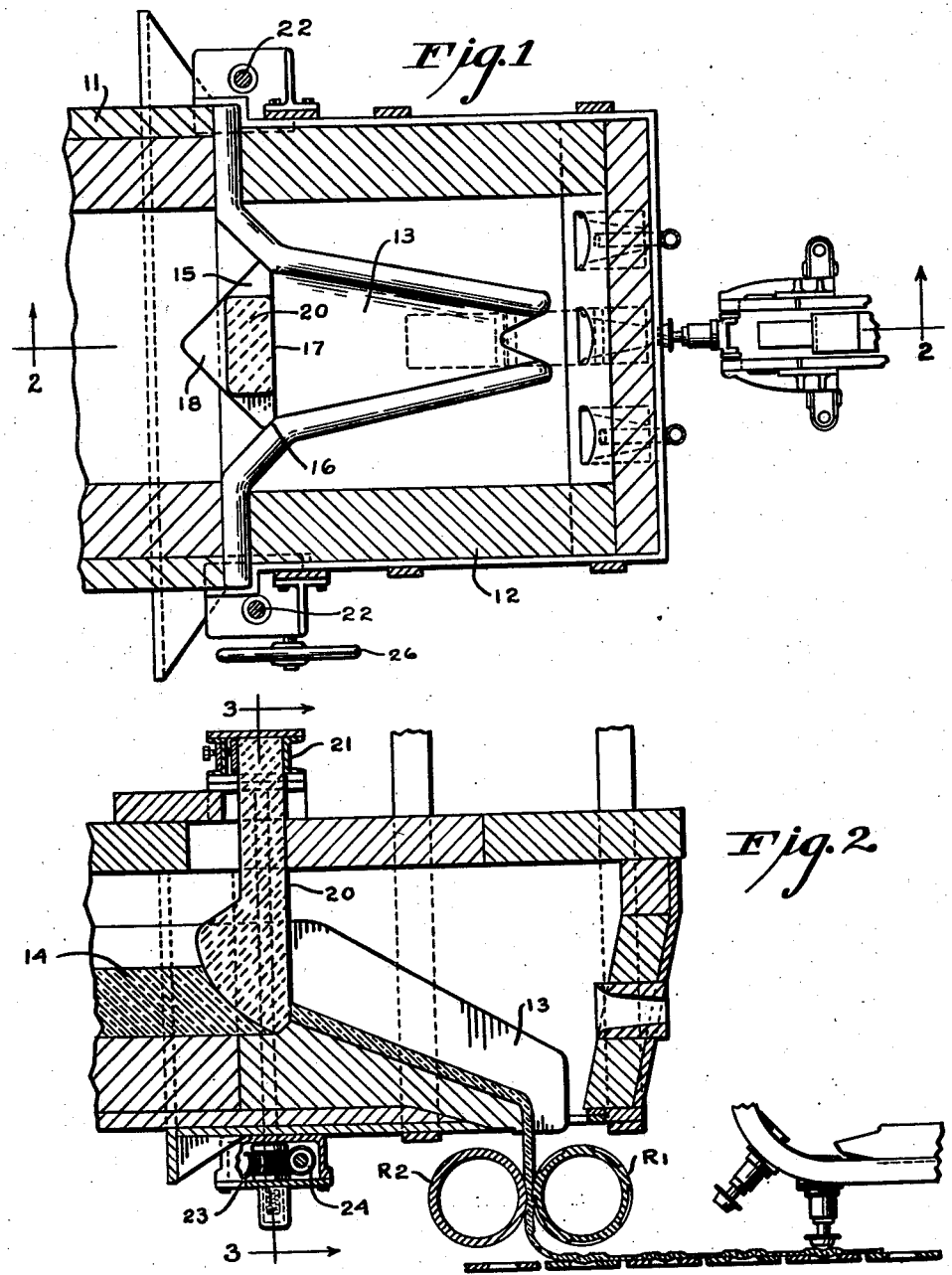

INVENTORS.
WALTER C. WEBER
AND EDMUND H. WELLECH
BY
ATTORNEY.

Patented June 16, 1942

2,286,323

UNITED STATES PATENT OFFICE 2,286,323

APPARATUS AND METHOD FOR FEEDING AND FABRICATING GLASS

Walter C. Weber, West Hartford, Conn., and Edmund H. Wellech, Corning, N. Y., assignors to Corning Glass Works, Corning, N. Y., a corporation of New York Application January 11, 1940, Serial No. 313,464

7 Claims. (Cl. 49—5)

The present invention relates to forehearth structures suitable for use with glass melting tanks and the like, and particularly to apparatus for and methods of feeding glass from such forehearths. In glass feeding arrangements wherein the flow control gate produces a skimming action, the continued erosion and solution of contaminated glass, which has accumulated at the surface of the bath back of the gate often causes localized concentration of contamination in the discharged glass which causes streaks to appear in much of the ware produced. Gates have, accordingly, been so designed that no skimming action occurs, the theory being that by allowing the contaminated glass to freely move into the working stream less ware will be contaminated than if such glass is allowed to accumulate and gradually dissolve into the stream.

The present invention has to do primarily with the further development of the latter type of gate particularly valuable in further reducing the concentration of contaminated glass finding its way into ware produced by ribbon or similar types of glass working machines which fabricate ware only from selected portions of the glass supplied to them. Such forms of fabricating apparatus are disclosed in Woods et al. Patent No. 1,790,397 and that disclosed in a co-pending Gray, Pond and Weber application Serial Number 224,628, filed September 12, 1938, which has matured into Patent No. 2,263,126, dated November 18, 1941. In these and similar forms of glass working machines the molten glass after issuing from the forehearth is pressed in a direction normal to the stream and from points laterally disposed with respect to the front and rear of the forehearth, and articles are subsequently formed only from the central area of the pressed plastic glass.

It will be evident from the foregoing that by directing the flow of the surface glass to selected outer portions of the stream such glass may be kept out of the area from which articles are fabricated.

It is a prime object of the present invention to reduce to a minimum the amount of contaminated glass finding its way into fabricated ware.

Another object is an improved method of feeding and forming glass.

Further objects are novel designs of flow control gates.

The invention embodies among its features forehearths equipped with flow control gates of such design that not only may all skimming action be avoided, but in addition the movement of the surface glass may be so directed as to comprise that part of a glass blank which is left unused after an article is fabricated therefrom.

In the accompanying drawings for the purpose of illustration of the invention, the same has been shown arranged for feeding glass to a ribbon machine such as disclosed in the above referred to Woods et al. patent.

Fig. 1 is a sectional plan view, taken on line 1—1 of Fig. 3, of an apparatus embodying one form of the invention and a fragment of a fabricating apparatus;

Fig. 2 is a sectional side elevation on line 2—2 of Fig. 3;

Fig. 3 is an end elevation in section on line 3—3 of Fig. 2;

Fig. 4 is a perspective view of the lower portion of a vertically movable flow control gate;

Figure 5:
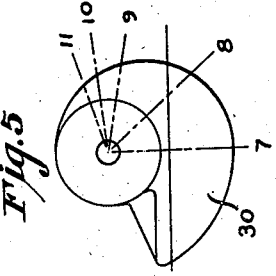
Fig. 5 is an end elevation of a rotary form of flow control gate.
Figure 12:
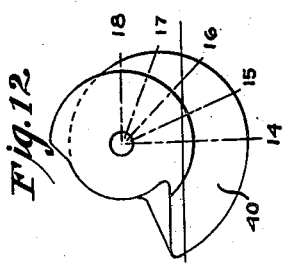
Fig. 12 is an end elevation of an alternative form of rotary gate.
Figure 6:
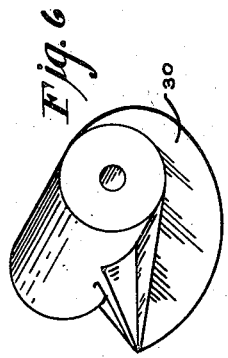
Fig. 6 is a perspective view of the gate illustrated in Fig. 5.
Figure 13:
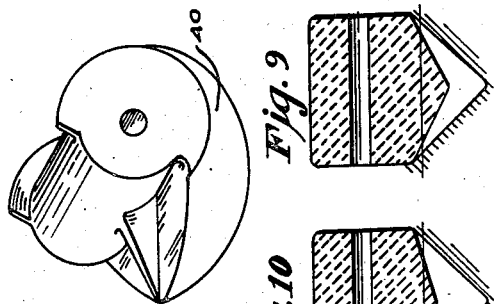
Fig. 13 is a perspective view of the gate shown in Fig. 12.
Figure 14:
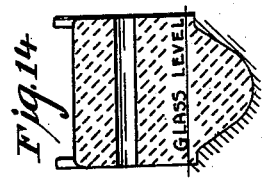
Figs. 14 to 18 are sectional views of the gate illustrated in Figs. 12 and 13 taken on lines 14—18 of Fig. 12, and also showing in section the trough of a forehearth with which the gate is associated.

Referring now to Figs. 1 to 4 of the drawings, 11 designates a glass melting tank having an attached and suitably heated forehearth 12 containing a glass flow trough 13 over which glass 14 flows from the tank under control of a gate 15. The trough at the point of juncture with the tank wall, in general, is of V configuration and has a surface adapted to be engaged by the chamfered surface 16 of the gate 15. The gate, in general, is triangular in plan and has a flat perpendicular fore surface 17 bridging the opening between the tank and forehearth, with its aft portion 18 projecting into the tank and functioning as a wedge to divide and direct the flow of surface glass toward the edges of the stream.

The gate 15 has a supporting stem 20 formed integral therewith which is clamped in a crosshead 21 adapted to be raised and lowered to control the glass flow by screw shafts 22 threaded into worm wheels 23 and rotatable by worms 24 carried by a transverse shaft 25 rotatable by a hand wheel 26. The pitch of the threads on shafts 22 and worm wheels 23 is such that the gate securely remains at any height to which it has been moved. As is evident from the drawings, on opening of the gate glass from the top surface of the supply body in particular is guided toward the edges of the trough 13 which is of such contour that this glass tends to remain in the outer edges of the stream issuing from the trough. As this glass issues from the trough, lateral pressure applied from the sides of the stream opposite those containing surface glass, for example, by rollers R1 and R2 of an associated apparatus, tends to further force the surface glass toward the outer edges of the flattened glass. As a consequence, articles fabricated from central portions of the flattened glass do not contain glass drawn from the surface of the supply, or at most contain a minimum amount of such glass.

Figure 7:
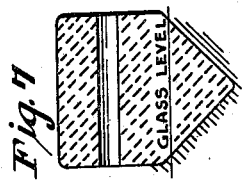
Figs. 7 to 11 are sectional views of the gate illustrated in Figs. 5 and 6 on lines 7—11 of Fig. 5 and also showing in section the trough of a forehearth with which the gate is associated.
Figure 15:
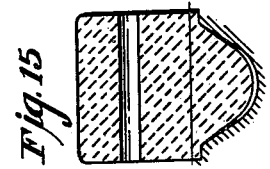
Figure 8:
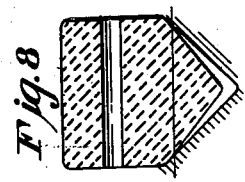
Figure 16:
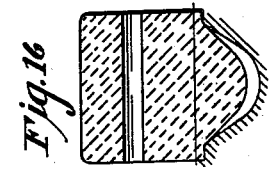
Figure 9:
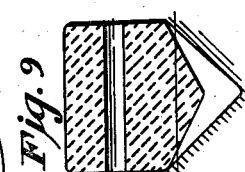
Figure 17:
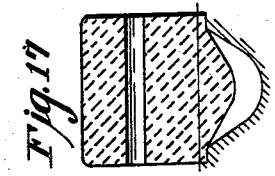
Figure 10:
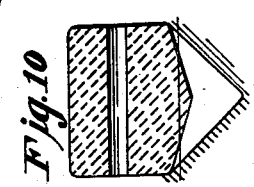
Figure 18:
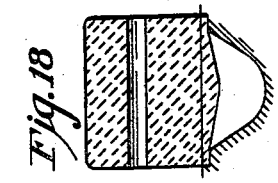
Figure 11:
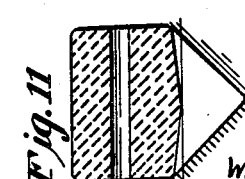

In the form of the invention illustrated in Figs. 5 to 11, the glass flow is controlled by a rotary gate 30 having cross sections progressively varying from a contour fully closing the trough to the flow of glass as illustrated in Fig. 7, to a wide open position illustrated in Fig. 11, permitting a wide range of rates of glass flow. In any position, the portion of the gate facing the melting tank is of a similar shape to portion 18 of the gate disclosed in Figs. 1 to 4 and, accordingly, this gate also tends to guide the surface glass toward portions of the stream flowing along the edges of the trough.

In the form of the invention illustrated in Figs. 12 to 17, the rotary gate 40 and trough is similar to that disclosed in Figs. 5 to 11, the main difference being that the trough is more nearly U-shaped and the shape of the gate correspondingly modified. In this form of the invention all glass is withdrawn from below the surface of the supply body, but owing to the shape of the trough and that of the portion corresponding to 18 of Figs. 1 to 4, any surface glass entering the stream is divided and tends to be drawn by the adjacent under surface glass into the sidewalls of the stream. Gates of the type illustrated in Figs. 5–18 may be rotated varying degrees and held in any position to which they have been rotated in any convenient manner. For example, the gate carrying shaft can have keyed thereto a worm wheel similar to wheel 23 and the wheel rotated by a worm such as 24 carried by a shaft such as 25 and equipped with a hand wheel such as 26. The pitch of the threads of wheel 23 and worm 24 is so chosen that it prevents pressure exerted on the gates from moving them from their adjusted positions.

What is claimed is:

1. The method of producing ware from other than surface glass of a molten supply body which comprises flowing the surface and under surface glass from the supply body in the form of a stream, forming the stream into a flattened ribbon with the sub-surface glass constituting the central portion thereof and the surface glass forming oppositely disposed side edge portions of the ribbon, and fabricating ware from only the central portion of the ribbon.

2. The method which includes guiding surface glass of a stream issuing from a parent supply body to oppositely disposed preselected locations in the stream, so flattening the glass which has issued from the parent supply body that portions thereof occupied by surface glass became oriented in opposite edges of the flattened glass, and fabricating ware from a portion of the flattened glass intermediate its edges.

3. In a furnace structure, a container having a glass flow trough, and a gate for regulating the flow of glass into said trough, said gate having a portion projecting into said container for guiding surface glass flowing therefrom to the lateral edges of said trough.

4. In a furnace structure, a container for molten glass having an outlet extending from widely separated points above the glass level in the container to a common point well below such glass level and means for urging surface glass flowing into said outlet towards its widely separated points, said means comprising a gate for said outlet having a wedge shaped portion the thinnermost edge of which is arranged in a vertical plane and so located as to be encountered by surface glass flowing into said outlet.

5. In a furnace structure, a container for molten glass, a trough associated with said container through which glass may be withdrawn from said container, a gate for regulating and guiding the flow of glass through said trough, said gate being rotatable to vary the flow and having the apex of a wedge shaped portion thereof arranged in a vertical arc in the container and extending from a point below to a point above the glass level therein and faced toward the on-coming glass.

6. In a furnace structure, a container for molten glass, a trough associated with said container through which glass may be withdrawn from said container, and a gate for said trough composed of a rotary member of refractory material shaped to completely close said trough when in one position and to progressively open a channel between it and the trough as the gate is rotated, said gate having a part projecting into the container at all times which whenever the gate is open tends to direct the flow of surface glass towards the sides of said trough.

7. The method of delivering glass from a supply body which includes flowing surface and subsurface glass into and through a delivery channel in such a manner that the glass issues from the channel in a stream having the surface glass therein oriented in oppositely disposed border portions thereof.

WALTER C. WEBER.
EDMUND H. WELLECH.